United States Patent

[11] 3,580,438

| [72] | Inventor | Jean Ernest Paul Raval<br>rue du Lac, 2416 Les Brenets, Switzerland |
|---|---|---|
| [21] | Appl. No. | 778,925 |
| [22] | Filed | Nov. 26, 1968 |
| [45] | Patented | May 25, 1971 |
| [32] | Priority | Nov. 28, 1967, Mar. 26, 1968 |
| [33] | | Switzerland |
| [31] | | 16713/67 and 4476/68 |

[54] WRISTBAND
13 Claims, 5 Drawing Figs.

[52] U.S. Cl. .................................................. 224/4, 63/4, 63/11
[51] Int. Cl. ....................................................... A44c 5/00
[50] Field of Search ............................................ 224/4—5, 4—4, 4—8; 63/4, 3, 11

[56] References Cited
UNITED STATES PATENTS

| 273,110 | 2/1883 | Kursh et al. | 63/11 |
| 2,542,284 | 2/1957 | Matson | (224/4—8) |
| 2,554,629 | 5/1957 | Meyer | 63/3 |

*Primary Examiner*—Robert G. Sheridan
*Assistant Examiner*—George F. Abraham
*Attorneys*—Robert E. Burns and Emmanuel J. Lobato

ABSTRACT: A wristband formed of elements assembled in end to end relationship and mounted on at least one flexible assembly wherein the said assembly is constituted by a helical spring surrounding a clamped extruded steel wire.

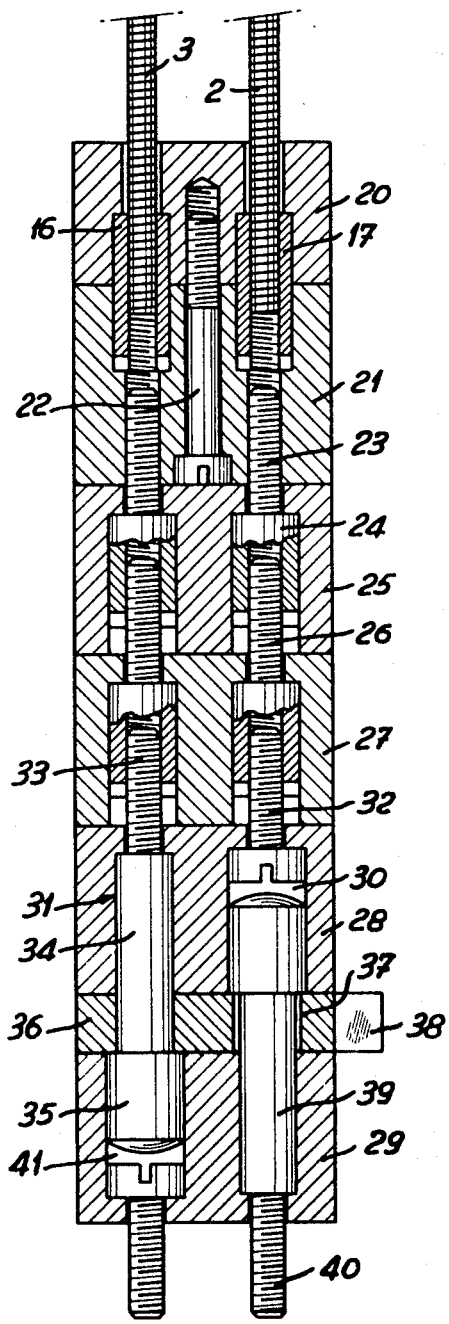

WRISTBAND

The present invention has for its object a wristband formed of elements assembled end to end and mounted on at least one flexible assembly. Wristbands of this type are known in which the flexible assembly is also extensible. The known assembly is constituted either by a helical spring or an assembly of rubber threads. The diameter of these assemblies being however very small, the resistance to pulling of the band is small. Additionally it is often preferred that the band be flexible while not extensible in order that it remains on the wrist without compressing the blood vessels.

The band according to the invention aims precisely at fulfilling the above-mentioned requirements. It is characterized by the fact that the said assembly is constituted by a helical spring surrounding a steel wire.

The intimate combination of the features of the helical spring, relatively very flexible and very extensible and those of the steel wire which is not extensible and has a reduced elasticity allows the obtaining of a flexible nonextensible assembly whose elasticity limit during bending is much greater than that of the steel wire. This is explained by the fact that the inner steel wire is retained by the helical spring which prevents it from bending in a given point and on the contrary forces it to become arcuate along an arc of a circle.

The accompanying drawings represents by way of example one embodiment of the invention.

FIG. 5 shows a clasp with auxiliary elements.

Figure 1:
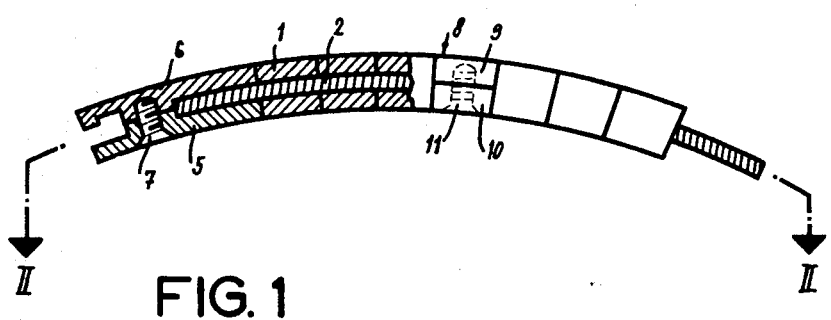
FIG. 1 shows an elevational view partly in cross section of a portion of a watch band.
Figure 2:
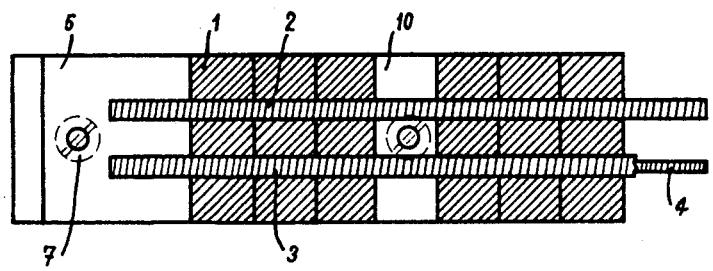
FIG. 2 shows a plan view in cross section along II-II of FIG. 1.

The band shown in the drawings is composed essentially of a plurality of generally rectangular elements 1 perforated with two holes by means of which they are passed on two helical springs 2 and 3 in each of which is received a steel wire 4, which is extended and then coiled. The wire pitch of the coil of each wire 4 is such that the wire can be introduced by screwing in the corresponding helical spring. The springs 2, 3 together with their corresponding steel wires 4 form flexible assembles.

The extremities of the springs are secured in an element having two superimposed parts 5 and 6 maintained together by screw 7. The extremity represented in the drawing by way of example constitutes one of the two parts of a clasp of a watch band, the other extremities of the springs being secured in similar manner to the watch case or to a support on the said case. The plates 5 and 6 have grooves that are striated transversely and in which are maintained the extremities of the springs.

Owing to the presence of the clamped extruded steel wire 4, springs 2 and 3 are no longer extensible but retain however a sufficient flexibility and have a relatively high resistance. In order that the different elements 1 be positioned on the two springs without play, there is generally disposed a tensioning element 8 that is interposed between two elements 1 or the fastening extremities and the first element 1 after mounting elements 1 on the springs. To this effect, this tensioning element 8 is in two parts 9 and 10 connected together by screw 11 or any other linking means.

In order to give to the bracelet the necessary curvature, elements 1 preferably have a trapezoidal cross section.

The tight extruded wire 4 being introduced by screwing into its spring, it can be used if need be as a link between two portions of the spring. This can also be useful in case of repairs to the band.

In a modification the springs can be fixed by screwing to the casing of the watch whose middle will have for this purpose threaded holes. The elements of the band are threaded in this case on the springs after their securing to the case.

Figure 3:
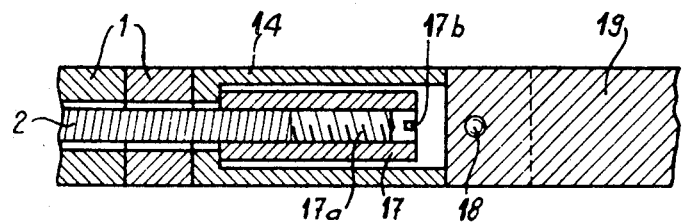
FIG. 3 is a cross section taken along line III-III of FIG. 4 of a device for securing the extremity of the binds.
Figure 4:
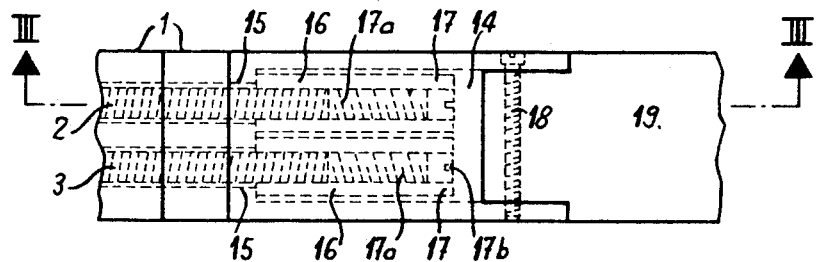
FIG. 4 is a plan view of this extremity.

The extremity of the band shown in FIGS. 3 and 4 comprises rectangular elements 1 perforated with two holes through which they are passed on two springs 2 and 3. These springs are formed of an outer helical spring in which is screwed an extruded steel wire. The extremity of these springs penetrates in a rectangular end piece 14 which is longer than elements 1 and has two holes whose axes extend those of the rectangular elements. These holes comprise a part 15 having a diameter equal to those of the holes of elements 1 and a chamber 16 for two tubular screws 17. These screws 17 have a tapping 17a of the same diameter and of the same pitch as that of the outer spiral spring of the binds and are screwed on the extremity of these springs which pass through the part 15 of the hole of part 14.

These nuts have a milling 17b which allows their screwing in by a tool. The other extremity, not shown, of the band comprises a similar part which is also provided with two tubular nuts; by screwing these there is obtained a perfect fastening of the elements whose tension can be adjusted by more or less tightening the nuts which bear in chamber 16. Part 14, shown on the drawing, comprises a screw 18 for securing it to an object, for example a watch. This part 14 can carry instead of this screw closing or hooking elements for a clasp.

The other end of the band, not shown, could also have another device for fastening the binds, or simply comprise an element such as 1 provided or not with means for fastening it to another object and in which will be set, welded or wedged the two other ends of springs 2 and 3.

The tubular nuts can be of non cylindrical shape, hexagonal for example so as to be tightened by a key, milling 17b then becoming superfluous.

An advantage of this fastening is that it is easy to remove one or several elements 1 in order to adapt the length of the band to the wrist of the wearer. Another advantage is the possibility of adjusting the rigidity of the band to suit the client.

The nuts finally could have a circular or polygonal head by which they would bear against the end part.

FIG. 5 shows a clasp accompanied by removable elements not traversed by binds 2 and 3 making it possible to shorten or extend very easily the bracelet. The assembly shown comprises an element 20 serving for the fastening of the end spring 2 and 3 by means of nuts 16 and 17 described previously. Here nuts 16 and 17 are not however completely embedded in element 20 but engage by an overlapping part in the hole of an intermediate element 21 screwed to element 20 by a screw 22. Element 21 has additionally two tap holes 23 in which are screwed two screws 24 completely embedded in intermediate element 25 and in the head of which is screwed a screw 26 of an identical element 27. It is thus possible to connect together as many elements as desired. To the last intermediate element, here element 27, is connected an element 28 constituting one of the two parts of a clasp, the other part being constituted by the part 29. The part 28 has two holes 30 and 31 and is connected to element 27 on the one hand by a screw 32 screwing in the head of screw 26 and on the other hand by the threaded end 33 of a rod 34 extended by a cylindrical part 35 of greater diameter than part 34. A lock 36 constituted by a pivoting bar is fixed rotatably on rod 34 and has a nick 37 and grasping means 38, nick 37 engages on rod 39 similar to rod 34 but lodged in the other element 29 of the clasp and connected by a threaded part 40 to elements identical to elements 25 and 27. Head 35 engages in a hole 41 analogous to hole 30.

All the linking elements, screw and clasp rod, are thus completely hidden in the elements of the band.

The elements of type 25 and 27 are positioned on either side of the clasp for the adjustment of the length of the bracelet can be made either by removing or by adding elements in such a way that the clasp always stays in the middle of the band.

I claim:

1. A band for watches and the like comprising at least one flexible assembly, a plurality of elements assembled in end to end relationship and mounted on said flexible assembly, said flexible assembly comprising a helical spring surrounding a coiled steel wire.

2. A band according to claim 1, wherein the coiled steel wire is screwed into the helical spring.

3. A band according to claim 1, wherein at least one tensioning element is provided, which tensioning element includes two assembled parts between which parts said spring is positioned.

4. A band according to claim 1, wherein a fastening element is provided, the ends of the helical spring being secured to the fastening element, said fastening element comprising two superposed parts at least one of which has transverse striations formed in grooves in which the ends of the spring are retained.

5. A band according to claim 1, wherein said coiled steel wire constitutes a linking element between two spaced portions of said helical spring.

6. A band according to claim 1, wherein two flexible assemblies and an end piece are provided, at least one end of each of said flexible assemblies being secured in said end piece, tubular screws screwed on said ends engaging in said end piece.

7. A band according to claim 6, wherein said end piece includes elements constituting a clasp.

8. A band according to claim 6, wherein said tubular screws have means engageable by a tool for turning the tubular screws.

9. A band according to claim 6, wherein said tubular screw have a part of their length formed with a polygonal shape.

10. A band according to claim 6, wherein said end piece has means for securing it to a timepiece case.

11. A band according to claim 6, wherein at least one removable element is provided which is not transversed by a flexible assembly.

12. A band for watches and the like comprising two flexible assemblies, a plurality of elements assembled in end to end relationship and mounted on the flexible assemblies, each flexible assembly comprising a helical spring surrounding a coiled steel wire, end pieces, at least one end of each of said flexible assemblies being secured in an end piece, a tubular screw screwed on said ends and engaging in said end piece, and including a plurality of removable elements not traversed by said two flexible assemblies, said elements being connected by means of hidden screws, the screw of one element being screwed into a head of the screw of the neighboring element and so on, to form a continuous link through the elements.

13. A band according to claim 12, comprising a clasp, said removable elements being positioned on each side of said clasp, said clasp comprising two rectangular elements to each of which is connected one group of said removable elements, a threaded rod securing each element of said clasp to a first said movable element, said threaded rod being screwed in the head of a first screw of the first removable element and a screw embedded in a hole and screwed in the head of a second screw of the first removable element, said rod engaging in a hole of the other element of the clasp, and a pivot bar carried by said rod and having a nick adapted to receive the rod of the other element of said clasp.